United States Patent [19]

Albrecht

[11] Patent Number: 4,603,549
[45] Date of Patent: Aug. 5, 1986

[54] EXPLOSION TYPE ROTARY TURBINE ENGINE

[76] Inventor: Hans G. Albrecht, Oberdorfstr. 5, D-5441 Hirten, Fed. Rep. of Germany

[21] Appl. No.: 703,839

[22] Filed: Feb. 21, 1985

[30] Foreign Application Priority Data

Feb. 21, 1984 [DE] Fed. Rep. of Germany ....... 3406187
Feb. 2, 1985 [DE] Fed. Rep. of Germany ....... 3503563

[51] Int. Cl.[4] .............................................. F02C 5/12
[52] U.S. Cl. .............................. 60/39.161; 60/39.39; 60/39.45; 60/39.78; 415/143
[58] Field of Search ................. 60/39.45, 39.37, 39.38, 60/39.39, 39.40, 39.76, 39.78, 39.79, 39.80, 39.81, 39.6, 39.62, 39.161; 123/204; 415/73, 90, 63, 143; 416/186

[56] References Cited

U.S. PATENT DOCUMENTS

| | | | |
|---|---|---|---|
| 836,945 | 11/1906 | Poole | 60/39.38 |
| 1,654,119 | 12/1927 | Enders | 60/39.38 |
| 2,276,404 | 3/1942 | Lundquist | 416/186 |
| 2,544,154 | 3/1951 | Hampton | 415/73 |
| 2,782,596 | 2/1957 | Lindhagen et al. | 60/39.45 R |
| 2,928,242 | 3/1960 | Guenther | 60/39.39 |
| 4,222,231 | 9/1980 | Linn | 60/39.45 R |

FOREIGN PATENT DOCUMENTS 917953 1/1947 France ........................ 60/39.45 R
464475 4/1937 United Kingdom ............... 123/204

Primary Examiner—Louis J. Casaregola
Assistant Examiner—Donald E. Stout
Attorney, Agent, or Firm—Karl F. Ross; Herbert Dubno

[57] ABSTRACT

A turbine engine has a axially elongated housing formed with a supercharging chamber and a plurality of angularly spaced combustion chambers having radially inwardly open intake sides. An intake is provided at the supercharging chamber and an outlet downstream of the combustion chambers. A shaft is rotatably supported in the housing at the axis and forms a passage extending axially between the supercharging chamber downstream of the intake and a location on the shaft level with the combustion-chamber intakes. A rotary-action fan rotationally fixed to the shaft in the supercharging chamber advances and compresses air from the intake on rotation of the shaft and this air can pass through the rotor passage into whichever chamber is angularly aligned with its downstream end. Fuel and heat are introduced into the combustion chambers, mix with the air charged therein via the passage from the supercharging chamber, and explode to produce high-pressure gases that pass into the upstream ends of helical tubes of a fixed on the shaft and thereby convert axial movement of the gases into rotary movement of the shaft. An axial-throughput turbine fan is provided on the shaft in the downstream housing section.

12 Claims, 12 Drawing Figures

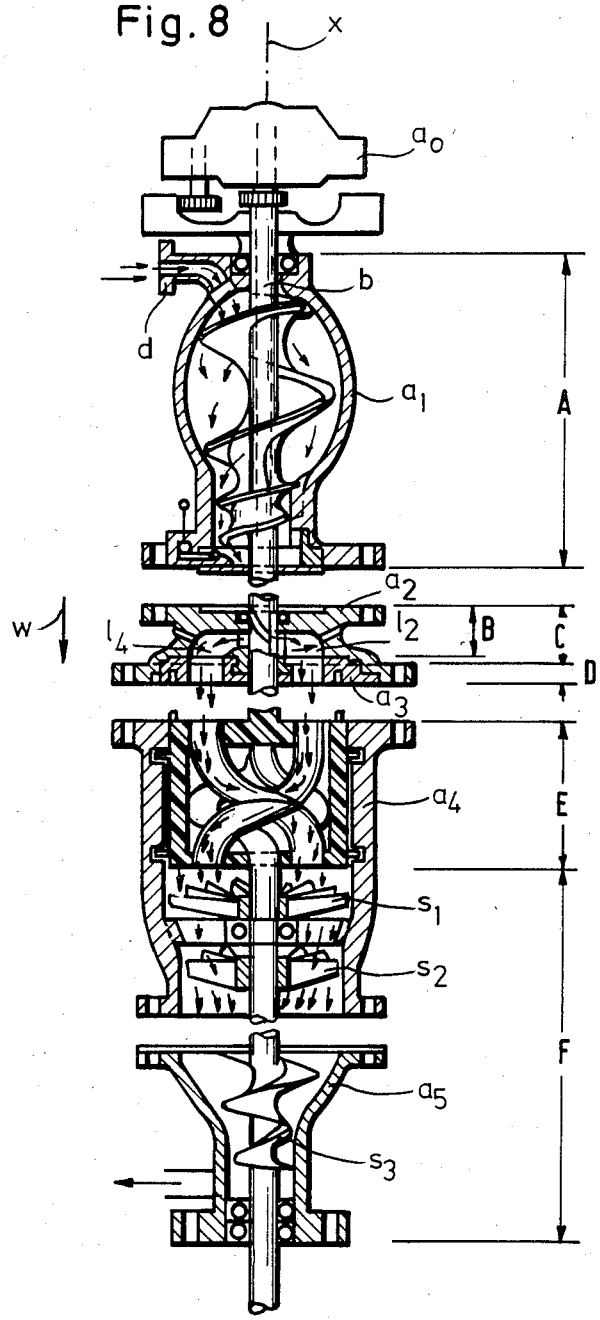

EXPLOSION TYPE ROTARY TURBINE ENGINE

FIELD OF THE INVENTION

The present invention relates to an explosion-type combustion engine. More particularly this invention concerns an explosion-type turbine engine.

BACKGROUND OF THE INVENTION

The standard piston engine wastes an enormous amount of energy by reversing direction of reciprocating parts such as pistons, valves, and tappets. As a result this type of engine generates considerable vibration and operates with a low degree of efficiency.

The rotary Wankel engine operates somewhat more smoothly. Nonetheless the rotor of this machine follows a noncircular path and therefore the engine develops a certain amount of throw. In addition complex seals that must move over noncircular paths are prone to leakage, and as a result the operating efficiency is less than ideal.

The standard jet-type turbine engine which converts the axial thrust of a continuous combustion into rotation is normally usable only in stationary applications. These engines are relatively dangerous and cannot find application in a standard motor vehicle.

Even if the combustion is contained such a turbine engine has no braking effect, like a piston engine. If the gas is released while a turbine-equipped car is going downhill, the engine will offer no appreciable resistance to being reverse-driven. This further makes such engines only limitedly usable in motor vehicles.

OBJECTS OF THE INVENTION

It is therefore an object of the present invention to provide an improved explosion-type gas turbine engine.

Another object is the provision of such a explosion-type gas turbine engine which overcomes the above-given disadvantages, that is which can be used in a motor vehicle with safety and that will provide some degree of engine braking, like a piston engine.

SUMMARY OF THE INVENTION

A turbine engine according to the invention has a housing extending along an axis and having relative to an axial throughput direction an upstream housing section forming a supercharging chamber, a middle housing section forming a plurality of angularly spaced combustion chambers having radially inwardly open intake sides, and a downstream housing section. The housing has at the upstream section an intake and at the downstream section an outlet. A shaft extends along the axis through the sections of the housing and is supported in the housing for rotation in a predetermined rotational sense about the axis. This shaft forms a passage having an upstream end opening axially into the supercharging chamber downstream of the intake and a downstream end opening radially on the shaft level with the intake sides of the combustion chambers. It fits the housing at the combustion chambers so as to block the intake sides of all but the intake side angularly aligned with the opposite end of the passage. A rotary-action fan rotationally fixed to the shaft in the supercharging chamber advances and compresses air from the intake in the direction on rotation of the shaft. Thus the compressed air can pass through the rotor passage into whichever chamber is angularly aligned with its downstream end. Fuel and heat are introduced into the combustion chambers, mix with air entering these chambers via the passage from the supercharging chamber, and explode to produce high-pressure gases. A valve plate is fixed in the housing and formed with axially throughgoing ports aligned with and opening axially into the respective combustion chambers. A rotor piston fixed on the shaft has an upstream face and at least one axially throughgoing tube having an upstream end open at the upstream face, a downstream end opening downstream into the downstream housing section and trailing the upstream end angularly in the rotational sense, and a nonaxial intermediate connecting portion extending between the upstream and downstream tube ends. The upstream end is brought into axial fluid-communication alignment with each valve port on each rotation of the shaft about the axis. Thus the high-pressure gases escape from the combustion chambers through the ports and pass into the tube of the piston to convert axial movement of the gases into rotary movement of the shaft. An axial-throughput turbine fan is provided on the shaft in the downstream housing section.

With the system according to this invention the entire engine operates in a purely rotary manner. The main functions—supercharging, distributing to the combustion chambers, sealing off these combustion chambers, converting the axial thrust of the gases from the chamber into rotation, and extracting the latent energy from the hot exhaust gases—are carried out by the cooperation of parts fixed to the rotor and parts fixed to the housing, with no appreciable parts not belonging to the one housing group or the rotor group. There are no reciprocating parts whatsoever so that operation will be virtually free of vibration and very silent. At the same time the considerable energy of semiconfined explosions, that is internal-combustion operation, is employed so that the turbine engine according to this invention can deliver considerable torque yet have controlled and confined combustion for maximum safety. In addition the balancing of the intake-side supercharger fan and the output-side exhaust fan balances out much of the thrust forces the system is subjected to.

Furthermore the systems applicable to different types of engines. The supercharger intake can be fed a fuel/air mixture or air alone. The combustion chamber can be equipped with glow plugs for diesel operation, or sparkplugs for standard gasoline firing. In addition fuel injectors can be used in these chambers if desired.

According to further features of this invention there is a valve at the passage for controlling flow from the supercharging chamber through the passage to the combustion chambers. This valve is virtually the only nonrotary or stationary part of the structure, but does not operate periodically so will cause no vibration.

The shaft is formed with at least two angularly offset wholly axially extending and outwardly open grooves and with at least one spiral groove interconnecting the axial grooves. These grooves form the passae, the spiral groove ensuring uniform distribution of the supercharged air to more than one chamber. Of course the numbers of grooves and combustion chambers could be varied, so long as each combustion chamber was cut off from the supercharger during its firing cycle.

It is also possible to provide a check valve in the intake oriented to permit flow into the supercharging chamber and block flow through the intake therefrom. Such a check valve gives significant engine braking, as with the ignition and fuel feed shut off, the compressor whose intake is closed will operate in reverse as a shaft brake.

The fan is a screwthread carried on the shaft and closely engaging the upstream housing section. Such construction is extremely simple, and this type of compressor is known for its smooth operation and quietness. In addition high enough pressures can be created for diesel operation.

It is also possible to provide a turbocharger connected to the downstream housing section and to the intake for feeding compressed air to the intake. In addition the shaft can be formed with a mainly axial second passage opening at one end into the first-mentioned passage and having an opposite end. A turbocharger powered by the exhaust gases is connected to the downstream housing section and to the opposite end of the second passage for feeding compressed air directly thereto through the shaft.

The piston according to the invention has a plurality of such tubes angularly offset from one another. In addition the valve plate has a downstream face closely axially juxtaposed with the upstream face of the piston and one of the faces is formed with a circular groove centered on the axis and open axially toward the other face and the other face is formed with a complementary ridge engaging therein and forming therewith an interference seal.

The piston according to this invention has a cylindrical outer surface centered on the axis and the housing has a complementary inner surface closely juxtaposed therewith. One of the surfaces is formed with a pair of axially spaced circular grooves centered on the axis and open radially toward the other surface and the other surface is formed with a complementary ridge engaging therein and forming therewith an interference seal. In fact the piston can be hollow and provided with means for passing a liquid coolant through it. The rges and grooves keep the coolant separate from the gases and such inside the engine.

The shaft of this invention can carry two such turbine fans axially spaced from each other in the downstream section of the housing. One of them can be a screw-type fan of increasing size in the downstream direction in which case the housing in the downstream chamber is complementarily shaped.

An electric brake of the thyristor type can be connected to the shaft for supplementary braking action. As in a railroad car, such braking action produces usable electricity rather than just dissipating away the braking energy as heat.

DESCRIPTION OF THE DRAWING

The above and other features and advantages will become more readily apparent from the following, reference being made to the accompanying drawing in which:

FIG. 8 is a exploded axial section through the engine of FIGS. 1 through 7.

SPECIFIC DESCRIPTION

As seen in FIG. 8 the engine of the instant invention is centered on an axis x and basically comprises a supercharging stage A at the upstream end relative to an axial throughput direction w, a combustion stage C mainly comprised of a distribution section B, an expansion stage D and a conversion stage E followed by an exhaust sage F. In the supercharging stage A air is drawn in and compressed, then is fed via the distributor B to the combustion and expansion stages C and D where it is mixed with fuel and ignited to produce hot gases that move axially in the direction w, but that are diverted angularly in the stage E to convert their axial movement into rotation. The remaining energy of the gases is extracted in the stage F and they are released.

Figure 1:
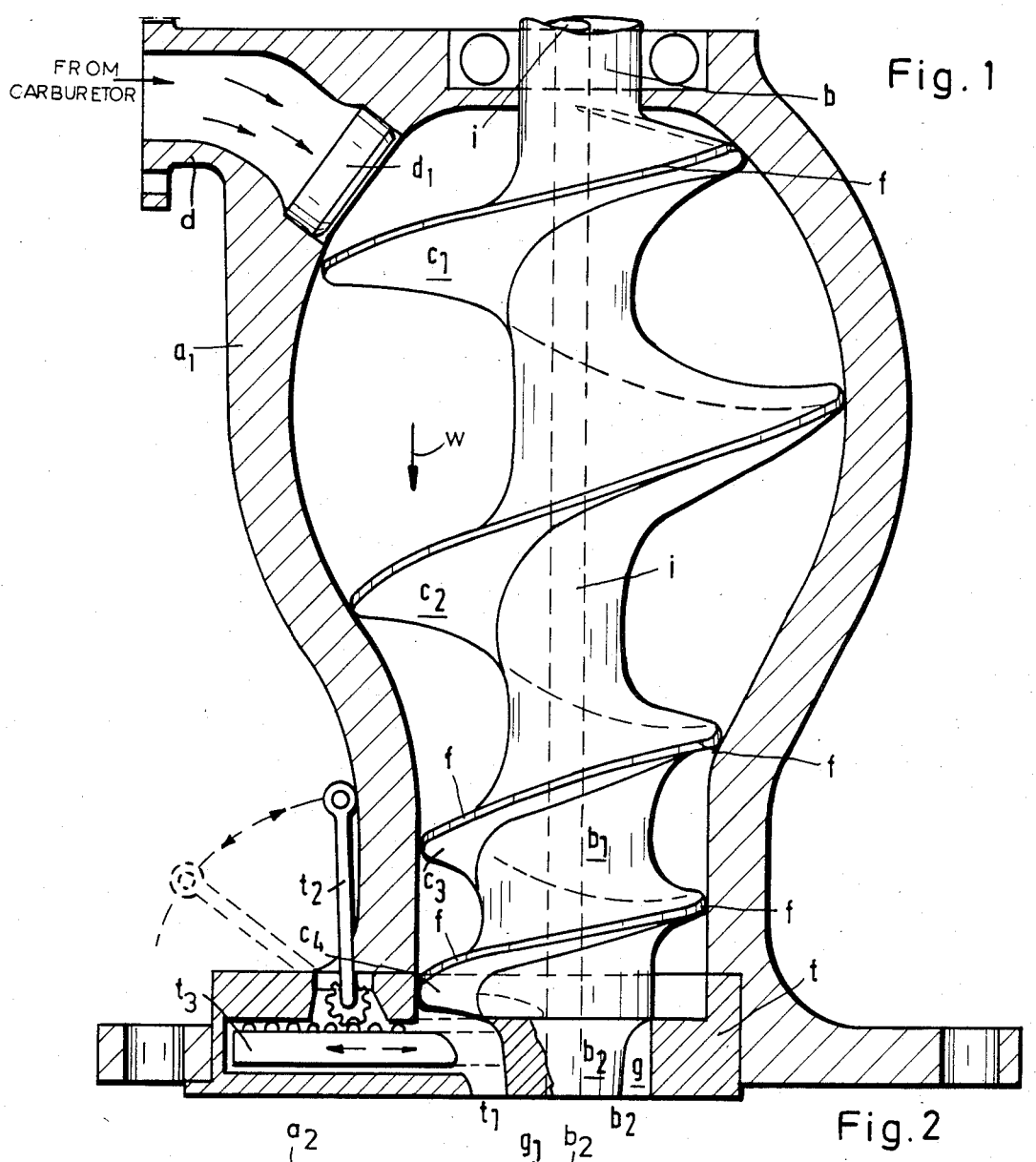
FIG. 1 is an axial section through the supercharger of the engine according to this invention.

As shown in FIG. 1 the supercharger A has a hollow elipsoidal housing $a_1$ with it major axis centered on the axis x and formed relative to the direction w with an upstream intake d controlled by a membrane-type check valve $d_1$ and connected to a carburetor in a normal gasoline engine and serving merely as an air intake in a diesel setup. Inside the housing $a_1$ is a shaft b centered on the axis x and formed with three continuous screwthread flights $c_1$, $c_2$, and $c_3$ and with a thickened region $b_1$ at the cylindrical downstream section of the housing $a_1$.

Thus the shaft b and screwthread $c_1$-$c_3$ together form a rotor that, when rotated in a standard direction y (FIG. 3A only), draws the air or air-fuel mixture in at the intake d and compresses it considerably while moving it in the direction w. The edge f of the screwthread $c_1$-$c_3$ is sealed against the inside wall of the housing $a_1$ and the downstream end of the housing $a_1$ is closed by a plate t tightly around the portion $b_2$ of the shaft b. A short axial passage $t_1$ extending along the shaft portion $b_2$ opens axially through the plate t into the extreme downstream end of the stage A. A valve slider $t_3$ can be operated by a lever $t_2$ to vary the flow cross section of the passage $t_1$ and thereby control acceleration.

Figure 2:
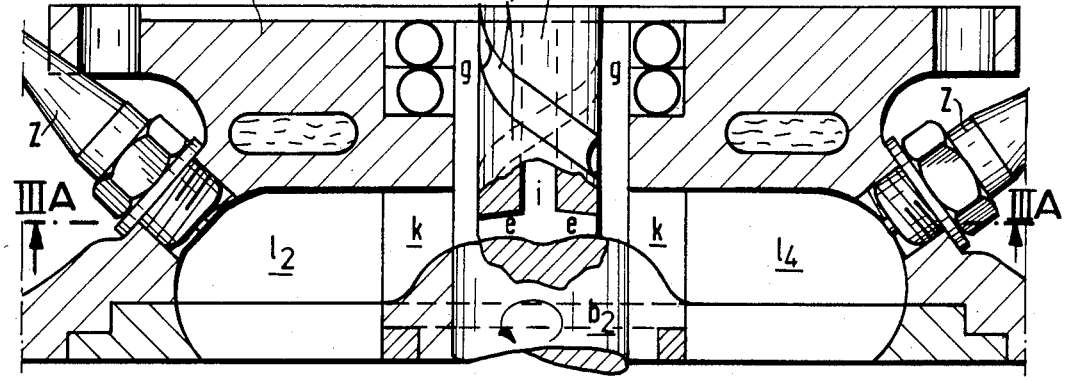
FIG. 2 is an axial section through the cylinder-head assembly.
Figure 3:
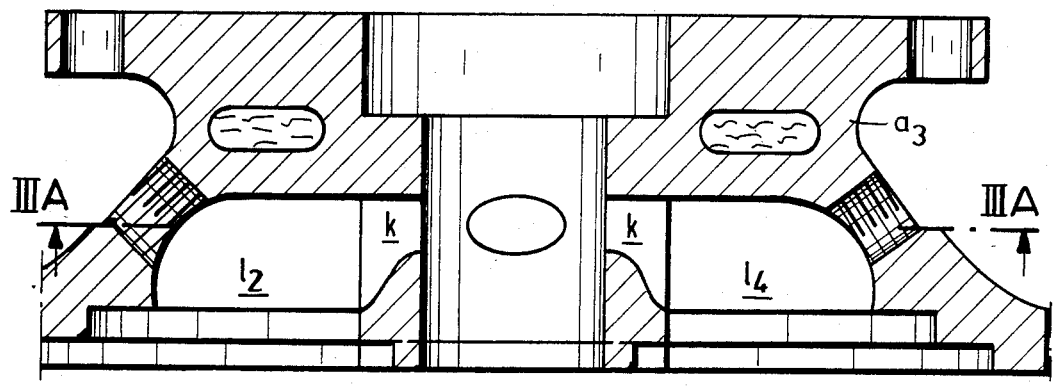
FIG. 3 is a view like FIG. 2 but showing the cylinder head only.
Figure 3A:
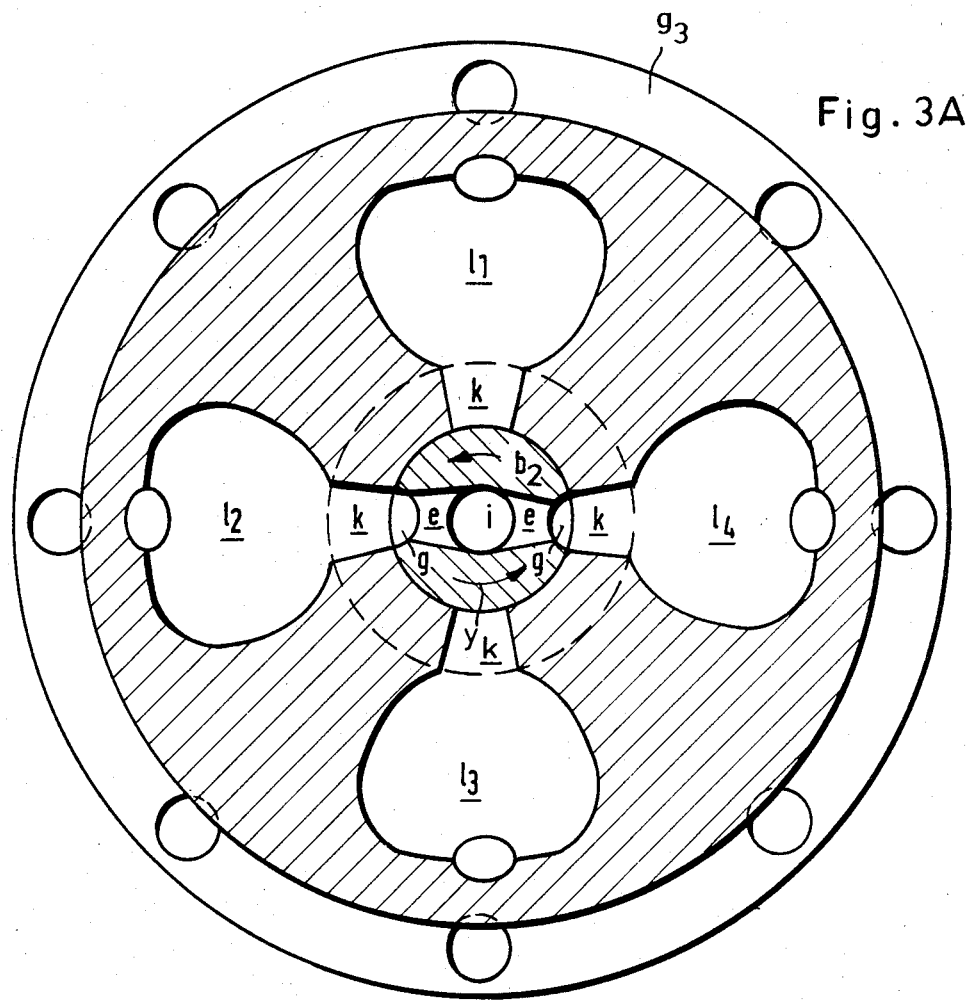
FIG. 3A is a cross section taken along lines IIIA—IIIA of FIGS. 2 and 3.

As seen in FIGS. 2 and 3A the rotor portion $b_2$ is formed with two diametrically opposite axially extending grooves g and with two similar spiral grooves $g_1$ with upstream ends ahead in the rotation direction y of their downstream ends. These grooves g and $g_1$ communicate with the passage $t_1$ and with radial intake passages k of combustion chambers $l_1$, $l_2$, $l_3$, and $l_4$ angularly equispaced about the axis x and formed in a housing $a_2$ flanged and bolted to the housing $a_1$. Each chamber $l_1$-$l_4$ has a respective sparkplug, glowplug, or injector Z, depending on type of setup, whether fuel-injected, gasoline, or diesel.

In addition the shaft B is formed with an axially centered bore i opening at diametrically opposite radial passages e at the level of the intake ports of the chambers $l_1$-$l_4$. The upstream end of this bore i is connected to another supercharger or carburetor $a_0$ as shown in FIG. 8. Thus more air and/or fuel can be fed via this route directly to the combustion chambers $l_1$–$l_4$.

Figure 4:
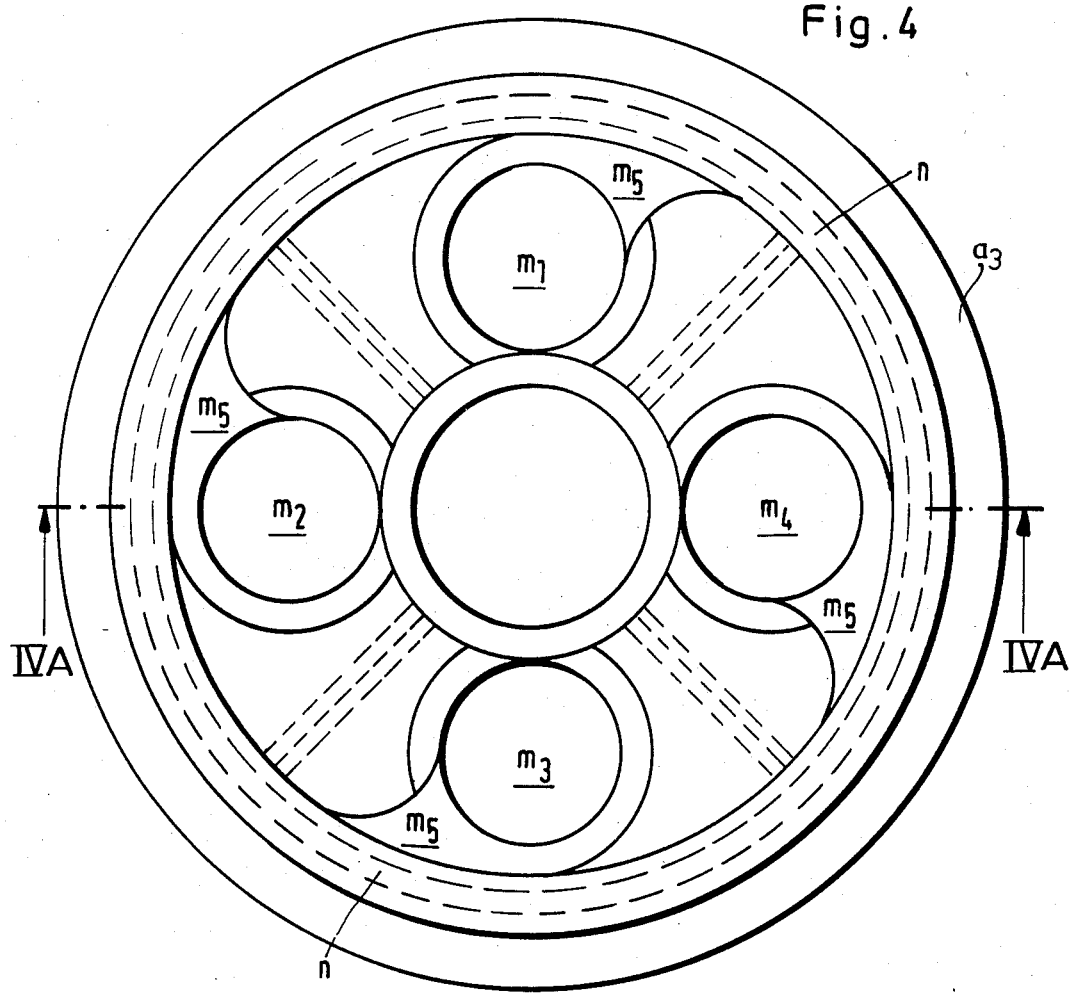
FIG. 4 is a top view of the valve plate.
Figures 5, 5A:
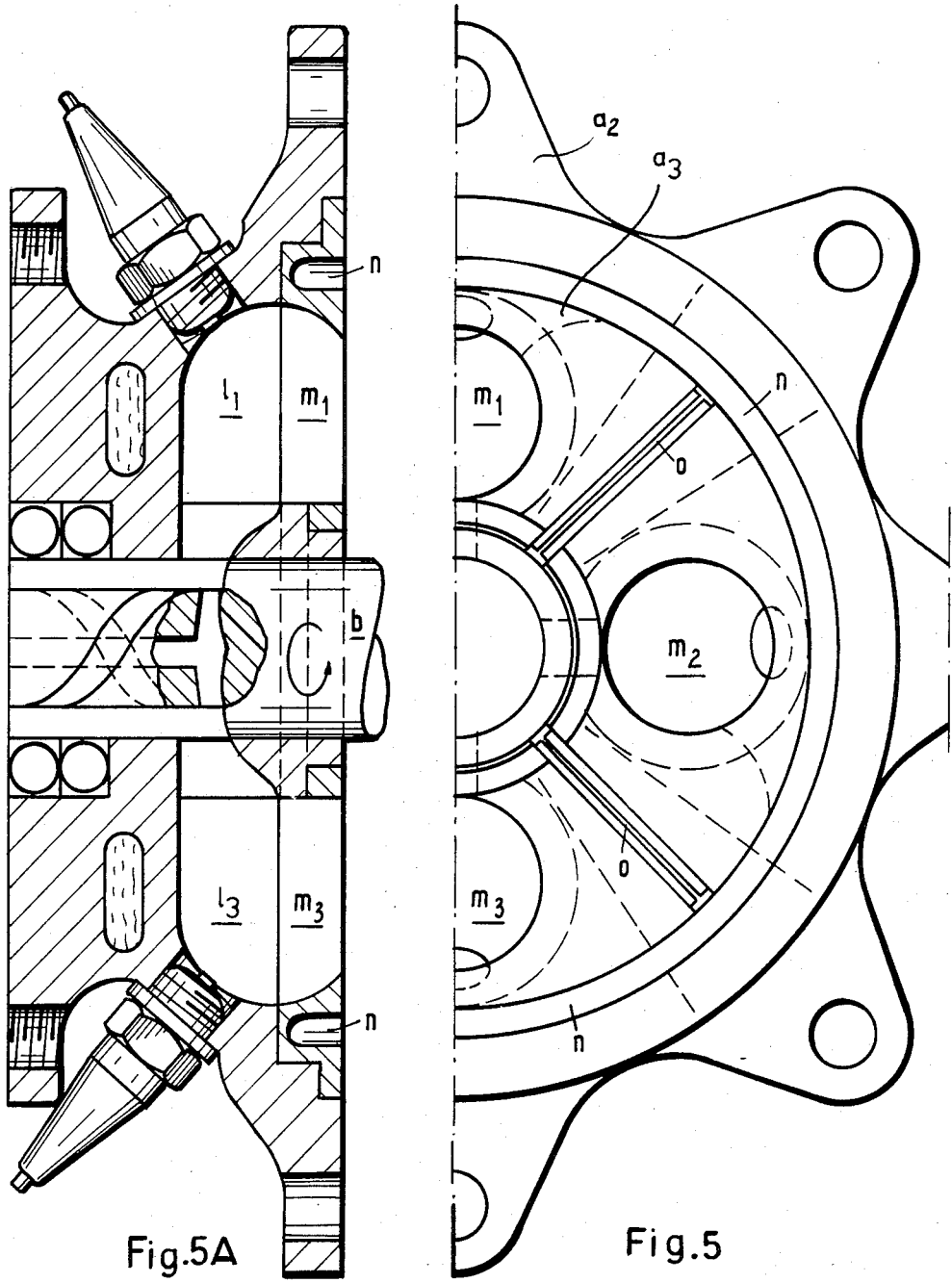
FIG. 5 is a bottom view of a portion of the valve plate.
FIG. 5A is an axial section similar to FIG. 3 but showing somewhat more of the structure.
Figure 6:
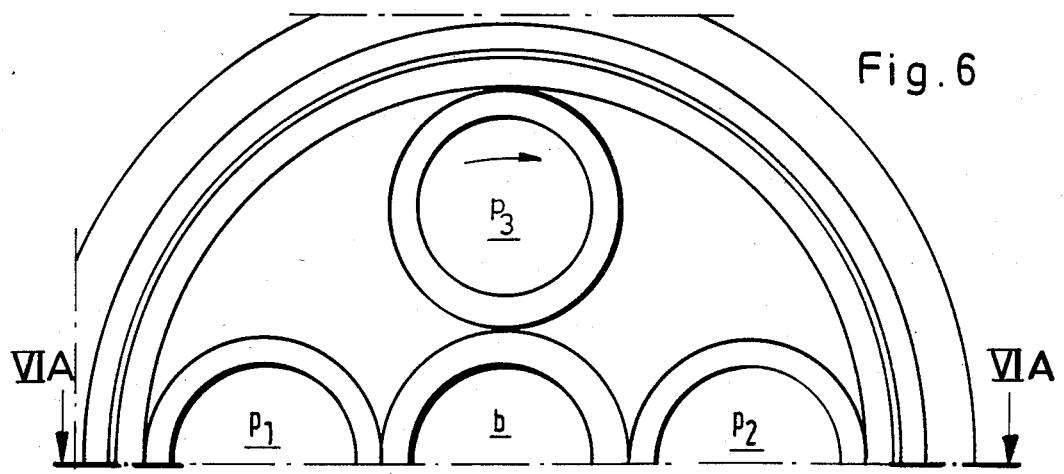
FIG. 6 is an axial top view of a portion of the rotary piston.
Figure 6A:
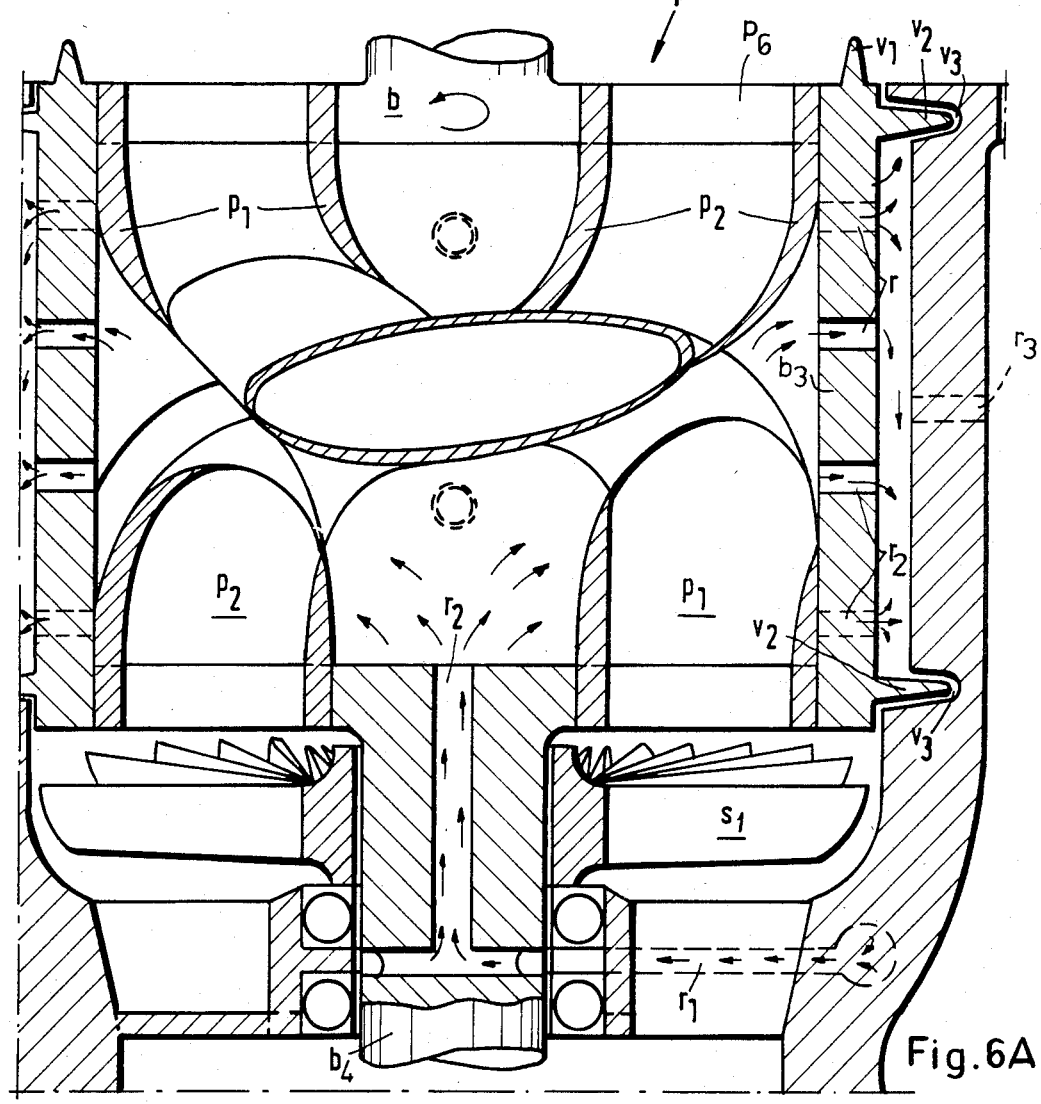
FIG. 6A is a section taken along line VIA—VIA of FIG. 6.
Figure 7:
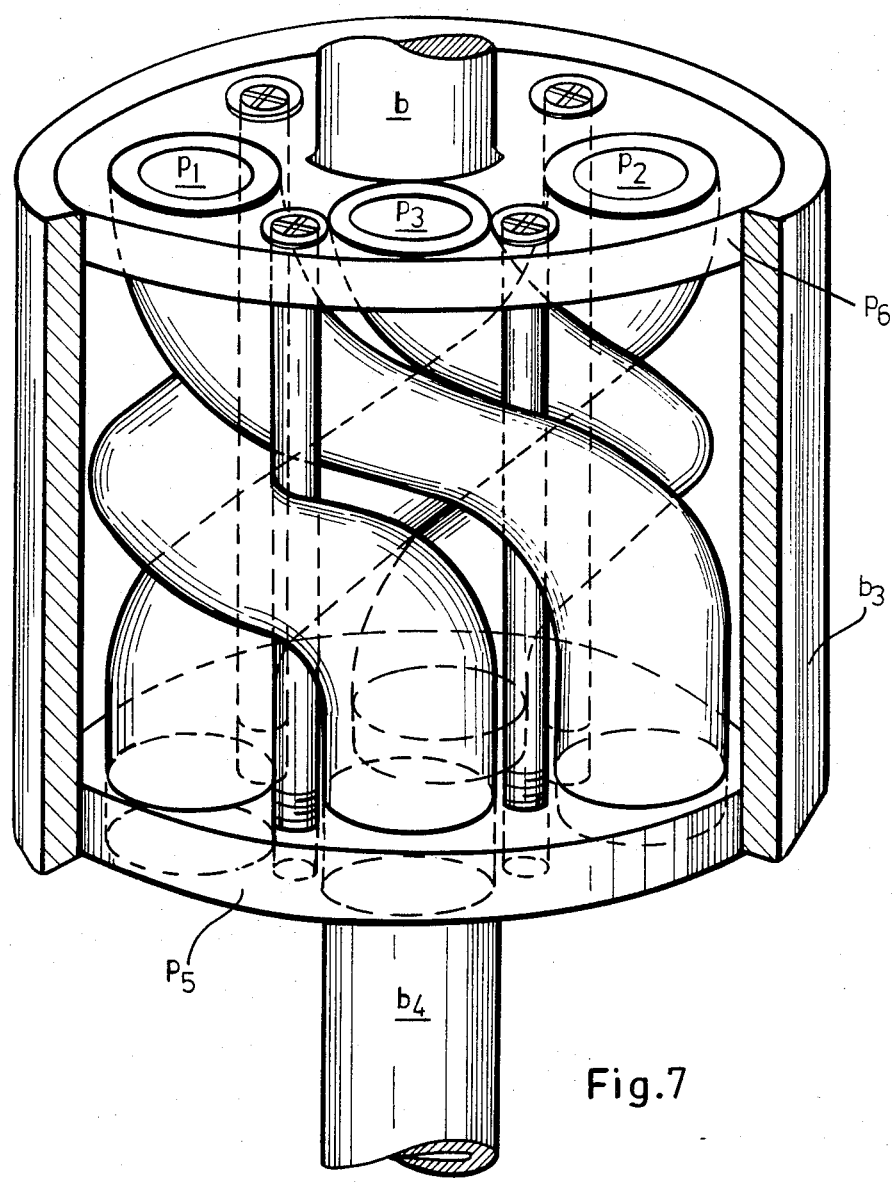
FIG. 7 is a perspective partly sectional and diagrammatic view of the piston.

The intakes k of the combustion chambers $l_1$–$l_4$ are radially inwardly closed by the shaft b except when aligned with the grooves g, at which time as mentioned above they are fed with compressed air at least. The chambers $l_1$–$l_4$ open axially in the downstream direction w into identical circular ports $m_1$–$m_4$ of a stationary valve plate $a_3$ whose upstream face is seen in FIG. 4 and whose downstream face is seen in FIG. 5. Stiffening webs $m_5$ are provided on the upstream face, and the downstream face is formed with an axially open circular groove n centered on the axis x. On its downstream face the plate $a_3$ is provided with four spring-loaded seal bars o that extend radially between the ports $m_1$–$m_4$.

Figure 4A:
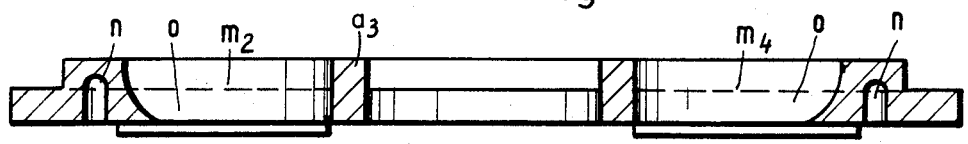
FIG. 4A is an axial section taken along line IVA—IVA of FIG. 4.

A piston p immediately downstream of the valve plate $a_3$ has four tubes $p_1$–$p_4$ that extend between a downstream end plate $p_5$ and an upstream end plate $p_6$, and a sleeve $b_3$ that forms part of the shaft b and that axially bridges the two piston ends $p_5$ and $p_6$. The tubes $p_1$–$p_4$ each have an upstream end that is angularly 180° ahead of its downstream end, and an intermediate portion that extends along a helix centered on the axis x between the respective ends. The upstream plate $p_6$ fits almost perfectly flatly against the downstream face of the valve plate $a_3$, and the upstream end of the sleeve $b_3$ is formed with an annular ridge $v_1$ that projects upstream into a generally complementary groove n (FIG. 4A) of the plate $a_3$, forming an interference-type seal. Similar such ridges $v_2$ that extend, however, radially outward from the upstream and downstream ends of the sleeve $b_3$ fit into complementary grooves $v_3$ in the surrounding housing portion $a_4$.

The shaft b has, downstream of its tubular portion $b_3$, a small-diameter shaft portion $b_4$ formed with an axial bore $r_2$ that opens into the area confined axially between the plates $p_5$ and $p_6$ and radially within the sleeve $b_3$ and that opens oppositely into a radial feed system that is part of a means for circulating a coolant, water for instance. The sleeve $b_3$ itself is formed with radially throughgoing holes $r_2$ and the housing $a_4$ with holes $r_3$. Thus a coolant can enter the piston p via the bore $r_2$ and cool the normally ceramic or heat-resistant synthetic-resin tubes $p_1$–$p_4$ as well as the similarly constituted tube $b_3$. As all the relative motion is purely rotary, it is possible for the various parts to fit together with very close spacings so that losses are minimized.

When the air-fuel mixture explodes in two of the chambers $l_1$–$l_4$ it will be unable to move back upstream since the timing of the explosions is such that the shaft b brings the grooves g out of alignment with the intakes k of the firing chambers before the mixture therein is ignited, so that this mixture will expand axially downstream through the valve plate $a_3$, entering the upstream end of whichever of the tubes $p_1$–$p_4$ is aligned with the respective valve port $m_1$–$m_4$. The helical curve of the tubes $p_1$–$p_4$ will angularly deflect the explosion gases and will have a reaction force that will oppositely rotate the piston p and with it the entire shaft b. The above-mentioned timing is therefore set in the structure of the engine and does not depend from anything other than rotary synchronous rotation.

Downstream of the piston p are several axial throughput turbine fans $s_1$ and $s_2$ carried on the solid shaft portion $b_4$ and even another screw-type rotor $s_3$ like that of the supercharger to extract the remaining energy from the combustion gases. These gases exit the piston p axially and still have some useful energy at this point.

Thus with the system of this invention it is possible to operate in a totally rotary manner. All of the functions such as supercharging and timing are carried out by rotating elements that are either stationary to the housing or fixed to the rotor, so that once properly set nothing can go wrong. In addition such an engine can balance the axial thrusts the shaft is subject to between each other and thereby make the system quite efficient.

I claim:

1. A turbine engine comprising:

a housing extending along an axis and having relative to an axial throughput direction an upstream housing section forming a supercharging chamber, a middle housing section forming a plurality of angularly spaced combustion chambers having radially inwardly open intake sides, and a downstream housing section, the housing having at the upstream section an intake and at the downstream section an outlet;

a shaft extending along the axis through the sections of the housing and supported in the housing for rotation in a predetermined rotational sense about the axis, the shaft forming a passage having an upstream end opening axially into the supercharging chamber downstream of the intake and a downstream end opening radially on the shaft level with the intake sides of the combustion chambers, the shaft fitting the housing at the combustion chambers so as to block the intake sides of all but the intake side angulary aligned with the downstream end of the passage;

means including a rotary-action fan rotationally fixed to the shaft in the supercharging chamber for advancing and compressing air from the intake in the direction on rotation of the shaft, whereby the compressed air can pass through the shaft passage into whichever chamber is angularly aligned with its downstream end;

means for introducing fuel and heat into the combustion chambers for mixing with air entering these chambers via the passage from the supercharging chamber and for exploding this mixture and producing high-pressure gases;

a valve plate fixed in the housing and formed with axially throughgoing ports aligned with and opening axially into the respective combustion chambers;

a rotor piston fixed on the shaft having an upstream face and at least one axially throughgoing tube having
 an upstream end open at the upstream face,
 a downstream end opening downstream into the downstream housing section and trailing the upstream end angularly in the rotational sense, and
 a nonaxial intermediate connecting portion extending between the upstream and downstream tube ends, the upstream end being brought into axial fluid-communication alignment with each valve port on each rotation of the shaft about the axis, whereby the high-pressure gases escape from the combustion chambers through the ports and pass into the tube of the piston to convert axial movement of the gases into rotary movement of the shaft; and an axial-throughput turbine fan on the shaft in the downstream housing section.

2. The turbine engine defined in claim 1, further comprising
a valve at the passage for controlling flow from the supercharging chamber through the passage to the combustion chambers.

3. The turbine engine defined in claim 1 wherein the shaft is formed with at least two angularly offset wholly axially extending and outwardly open grooves and with at least one spiral groove interconnecting the axial grooves, these grooves forming the passage.

4. The turbine engine defined in claim 1, further comprising
a check valve in the intake oriented to permit flow into the supercharging chamber and block flow through the intake therefrom.

5. The turbine engine defined in claim 1 wherein the fan is a screwthread carried on the shaft and closely engaging the upstream housing section.

6. The turbine engine defined in claim 1, further comprising
a supercharger connected to the upstream housing section and to the intake for feeding compressed air to the intake.

7. The turbine engine defined in claim 1 wherein the shaft is formed with a mainly axial second passage opening at one end into the first-mentioned passage and having an opposite end, the engine further comprising
a supercharger connected to the upstream housing section and to the opposite end of the second passage for feeding compressed air directly to the combustion chambers through the shaft.

8. The turbine engine defined in claim 1 wherein the piston has a plurality of such tubes angularly offset from one another.

9. The turbine engine defined in claim 1 wherein the valve plate has a downstream face closely axially juxtaposed with the upstream face of the piston, one of the faces being formed with a circular groove centered on the axis and open axially toward the other face and the other face being formed with a complementary ridge engaging therein and forming therewith an interference seal.

10. The turbine engine defined in claim 9 wherein the piston has a cylindrical outer surface centered on the axis and the housing has a complementary inner surface closely juxtaposed therewith, one of the surfaces being formed with a pair of axially spaced circular grooves centered on the axis and open radially toward the other surface and the other surface being formed with a complementary ridge engaging therein and forming therewith an interference seal.

11. The turbine engine defined in claim 1 wherein the shaft carries two such turbine fans axially spaced from each other in the downstream section of the housing.

12. The turbine engine defined in claim 11 wherein the furthest downstream shaft is a screw-type fan of decreasing size in the downstream direction and the housing in the downstream chamber is complementarily shaped.

* * * * *